Oct. 31, 1967   R. S. GREGOIRE   3,349,533
CHANNEL EXTRUSION AND SEAL FOR FRAMING PANEL EDGES
Original Filed July 12, 1965   2 Sheets-Sheet 1

INVENTOR.
RESTA S. GREGOIRE
BY
Walter S. Pavel
ATTORNEY.

Oct. 31, 1967  R. S. GREGOIRE  3,349,533
CHANNEL EXTRUSION AND SEAL FOR FRAMING PANEL EDGES
Original Filed July 12, 1965  2 Sheets-Sheet 2
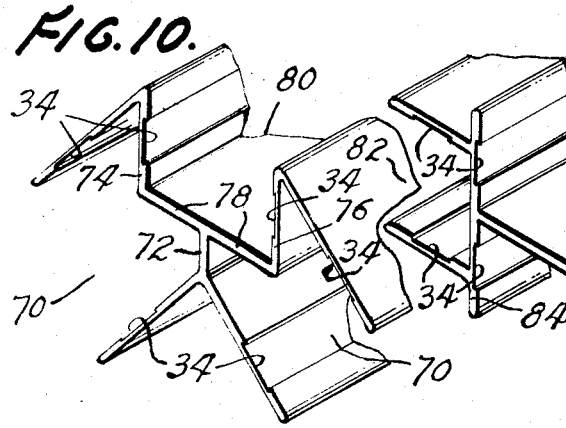
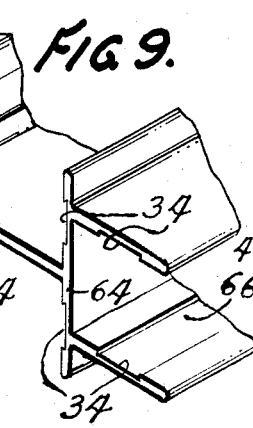
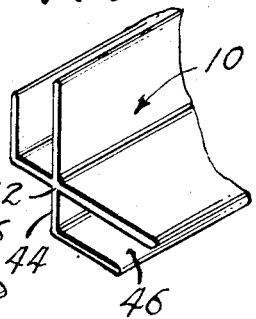
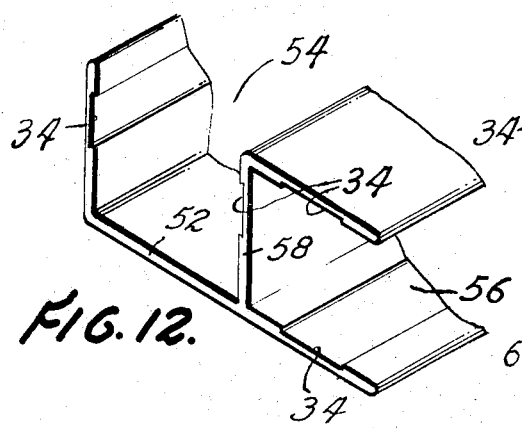
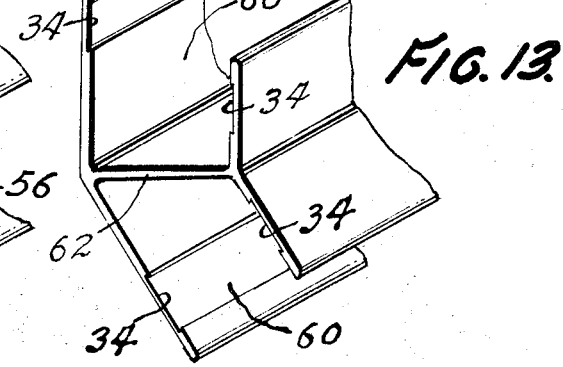
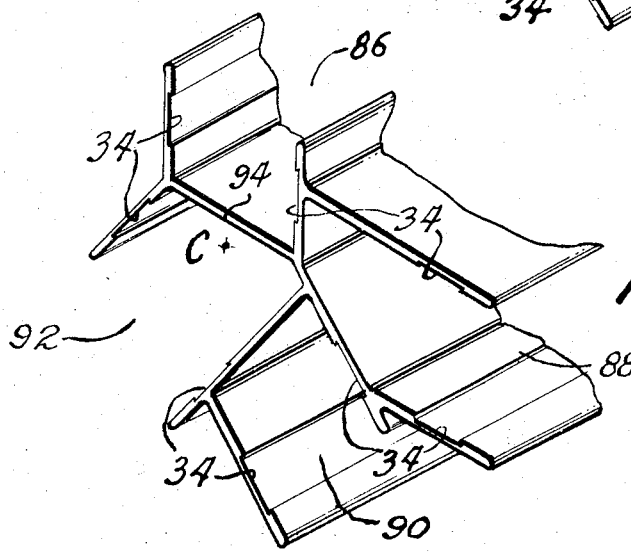
INVENTOR.
RESTA S. GREGOIRE
BY
Walter S. Pavl
ATTORNEY.

United States Patent Office 3,349,533
Patented Oct. 31, 1967

3,349,533
CHANNEL EXTRUSION AND SEAL FOR
FRAMING PANEL EDGES
Resta S. Gregoire, Newport, Pa., assignor to Gregoire
Engineering and Development Company, Adelphi, Md.
Continuation of application Ser. No. 475,307, July 12,
1965. This application Oct. 14, 1966, Ser. No. 586,899
18 Claims. (Cl. 52—397)

ABSTRACT OF THE DISCLOSURE

This disclosure is directed to a channel formed extrusion serving to provide framing means for panel edges, each channel being adapted to receive a panel edge and having a resilient sealing strip in at least one of its sides with ridges extending into the channel and having a sufficient height and width to cause relatively little resistance to insertion of the panel edges into said channel but providing considerably greater resistance to its withdrawal therefrom.

This is a continuation of application Ser. No. 475,307, filed July 12, 1965, which was a continuation-in-part of my pending prior application, S.N. 236,306, filed Nov. 8, 1962, now abandoned, for Channel Extrusion and Seal for Framing Panel Edges.

The present invention relates to room divider end guide and support channels for wall panels of buildings, fencing, containers and the like.

The object of the present invention is to provide a channel end strip for framing the end or edge of a wall panel or the like, and means in said channel for sealing and resiliently gripping the opposite sides of the edge of said panel against pull-out.

Another object is to make the above channel strip of extruded suitably stiff material having grooves in the inner sides of said channel strip, and resilient strips for fixedly mounting in said grooves and having rectangular ridges extending inwardly from said sides of the channel strip to form a good sealing and gripping means by receiving the edge of a wall panel without substantial friction during assembly of said channel strip on said edge, but providing great frictional resistance against withdrawal or disassembly of the parts.

Another object is to make a double channel extrusion having channel sides extending in opposite directions from a common channel bottom, and having the above sealing and gripping means, for joining two adjacent panels together in abutting relation.

Another object is to make extrusions providing a plurality of channels extending in different directions, each channel having the above sealing and gripping means for its corresponding panel.

Figure 2:
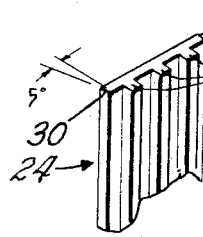
Figure 1:
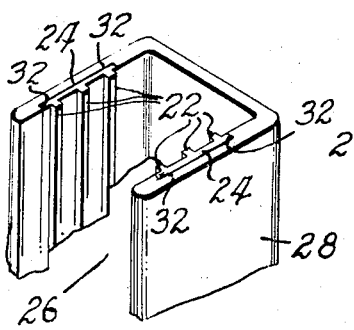
Figure 3:
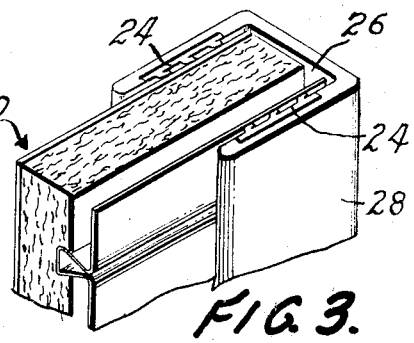
Figure 4:
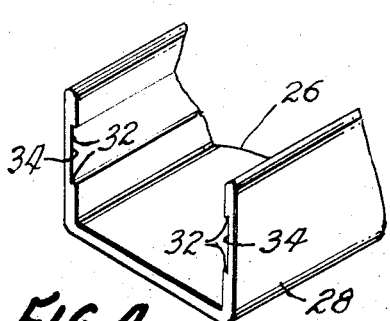
Figure 5:
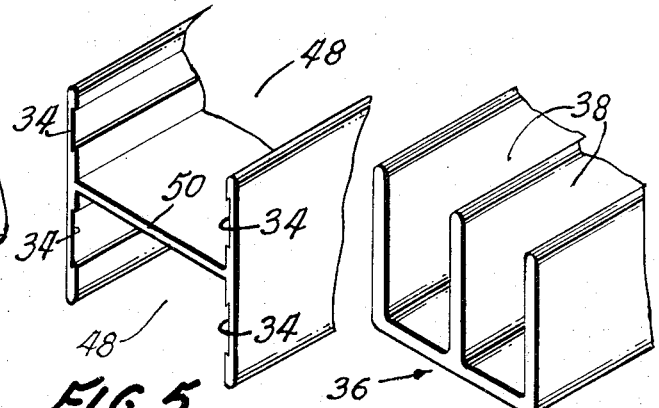
Figure 6:
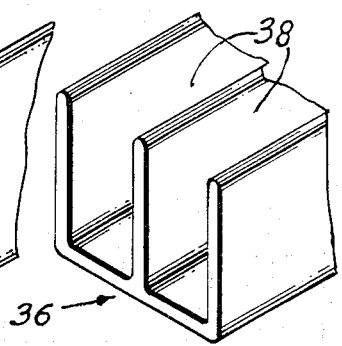
Figure 8:
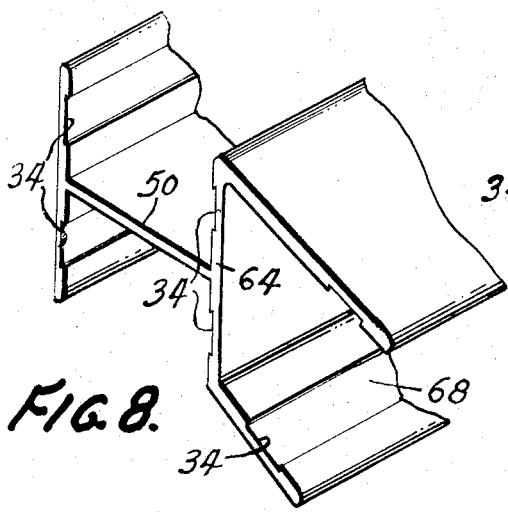
Figure 7:
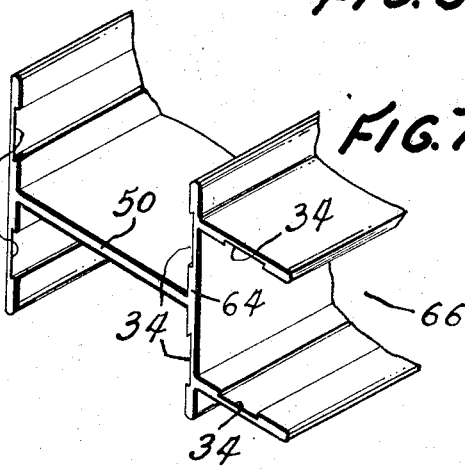

Other and more specific objects will appear in the following detailed description of several preferred forms of the invention as illustrated in the accompanying drawings, wherein:

FIG. 1 is a perspective view of an end extrusion of single rectangular channel form, with sealing and gripping insert strips set in the inner sides of the channel, FIG. 2 shows the end of one of said sealing and gripping insert strips slightly enlarged, FIG. 3 shows a portion of a wall panel assembly having a single channel end strip mounted over its end, FIG. 4 shows a similar channel strip or frame extrusion without the sealing and gripping insert strips, FIG. 5 shows a double channel extrusion for framing the abutting edges of coextensive wall panels, FIG. 6 shows a side-by-side double channel extrusion without insert grooving for receiving two wall panels for a double panel wall, FIG. 7 shows an extrusion for receiving two wall panels in abutting relation and one at right angles thereto, FIG. 8 shows a modification of this three channel extrusion providing another angular relation between the one wall panel and the two abutting wall panels, FIG. 9 is a further modification of the above right angular arrangement of channels providing a fourth channel on the opposite side of the abutting channels, FIG. 10 shows a Y-arrangement of channels, FIG. 11 shows a right angular arrangement of the bases of two channels adapted to form a right angle V-groove in the outside corner of the extrusion, FIG. 12 shows an L-arrangement of two channels, FIG. 13 is a V-arrangement for receiving two wall panels at an obtuse angle, and FIG. 14 is an extrusion having four channels facing in four random directions.

The number of channels in an extrusion may vary as may be required and their arrangement may be such that their axes may radiate from a common center or from different centers as may be desired. Some of the channels bottoms in a cluster of channels may be coextensive in part with portions of the sides and bottoms of adjacent channels and need not necessarily be perpendicular to the sides of the corresponding channels.

The wall panel 20 as shown in part in FIG. 3 may be of the type disclosed in pending application S.N. 224,161 filed Sept. 17, 1962 for Building Panel Assembly, or of any other construction having a suitable overall thickness, such that the seal ridges 22 of the insert strips 24 of resilient material, such as rubber, will bend to not only receive the end of the wall panel with little friction into the channel 26, but also to resiliently wedge against the opposite sides of the wall panel 20, so as to grip it firmly against removal from the channel.

A channel extrusion 28 of one channel width may be used for a wide range of wall panel thicknesses by using insert strips 24 of different thicknesses, complementary to the corresponding wall thickness to provide a good seal and a desirably firm grip on the wall by means of the projecting ridges 22. The base of the strips 24 is provided with bevelled edges 30 to fit into the angularly undercut edges 32 of the mounting grooves 34 in the sides of the channel of the extrusion 28.

These mounting grooves are not necessary for the channel strips where no gripping problems are encountered as in base strips for framing the bottom edge of a wall panel, or in topping strips for framing the upper edge of a wall panel. Even if sealing such top or bottom edges is desired, suitable packing strips of this or any other type may be used between the wall panel and the opposite sides of the channels without having any mounting grooves for these packing strips.

It is to be understood that, where the insert strips are used, the dimensions of the channel strip and the insert strips are so selected that the spacing between the tops of the rectangular ridges extending from the insert strips fixed in the opposite sides of the channel strip will be substantially less than the thickness of the wall panel to be gripped, and the spacing between the bases of these ridges will be substantially greater than the thickness of the wall panel, the width of the ridges being such that the ridges will not bend in the opposite direction, after being bent inwardly by insertion of the wall panel into the channel strip, by withdrawal of the panel against the great frictional resistance produced by the pressure of the wedging of the resilient ridges against the panel sides.

FIG. 6 shows a double channel extrusion 36 in which no mounting grooves are provided in the sides of the channels 38 for use in framing the top or bottom edges of double wall panels, or for any other framing use where good gripping is not required because there is no tendency for separation of the parts. If sealing is required, any conventional packing means may be used. Good gripping, however, is not possible without some means of fixing the packing means to the sides of the channel strip, and easy mounting of the panel into the channel strip to a good gripping position is then possible only with an insert strip of the type here disclosed.

FIG. 11 shows another form of double channel extrusion 40 wherein the channel sides extend at right angles from a common corner 42, and the channels are not provided with packing strip grooves, because no gripping of the wall panel edges is required, the wall panels being at right angles to each other, it is more difficult to pull them apart. This extrusion may be used in the corners of a container, for framing the corner edges of the adjacent wall panels of the container. No gripping would be required on the bottom panel sides of a container, if e.g. the corner extrusions 42 at opposite sides of the bottom panel were set over the edges of side supporting beams in a bottom support frame. The corner extrusions at the bottom of the container would be held against separation because the bottoms 44 of the horizontal channels 46 would be set against the inner sides of the opposite side supporting beams. A similar top support frame could be used around the top of the container to hold the upper corner extrusions from separation from the top panel. The top and bottom support frames could furthermore be connected together by the vertical corner extrusions of the container to hold the entire container assembly together in closed condition and adapted to be sealed if desired, with sealing insert strips.

A variety of extrusions for framing and joining the edges of two or more wall panels meeting at any angles relative to each other are illustrated in FIGS. 5, 8 to 10 and 12 to 14. Each of the channels in these extrusions is provided with sealing strip mounting grooves 34 in its inner sides for receiving the sealing and gripping strips 24 of the proper thickness whenever a gripping joint is desired.

The extrusion in FIG. 5 has two channels 48 extending in opposite directions and having a common channel bottom 50, at right angles to the sides of the channels, for receiving the edges of wall panels in abutting relation to each other.

The extrusions in FIGS. 12 and 13 have two channels extending in inclined directions. FIG. 12 shows the channels extending at right angles, FIG. 13, at an angle other than normal. The bottom 52 of channel 54 in FIG. 12 is coextensive with the outer side of channel 56, and the inner side 58 of channel 54 forms the bottom of channel 56. This arrangement provides an overlap of the side of the edge of one panel over the end of the edge of the other panel. The channels 60 in FIG. 13 have a common bottom 62 at an angle substantially bisecting the angle between the directions in which the channels extend.

The extrusions in FIGS. 7, 8 and 10 have three channels, those in FIGS. 7 and 8 having two of the channels extending in opposite directions from a common bottom 50, just as in the extrusion shown in FIG. 5, but in addition they have a third channel extending to one side 64 of these two channels. In FIG. 7, the third channel 66 extends at right angles to the side 64; in FIG. 8, the third channel 68 extends from the side 64 at some other angle. The width of the third channel may correspond with the width of side 64 as in FIG. 8 or it may be less as in FIG. 7. In FIG. 10, a Y-type arrangement of the three channels is formed by having two of the channels 70 extending at an angle to each other from angular bottoms comprising a common portion 72 at the inner corner of the extrusion and portions extending oppositely from said common portion 72 to the opposite sides of the respective channels 70, to form the two sides 74 and 76 and the halves 78 of the bottom of the third channel 80 in the outer corner of the extrusion.

The extrusions in FIGS. 9 and 14 have four channels, their arrangement being normal in FIG. 9, and in FIG. 14 they extend in four different directions radially from a common center C. The arrangement of three of the channels in FIG. 9 is the same as in FIG. 7, the fourth channel 82 extending at right angles from the side 84 of the two channels opposite the side 64, portions of the sides 64 and 84 forming the bottoms of channels 66 and 82 respectively. The arrangement of channels in FIG. 14 may have any desirable angular relations between the four channels, any suitable combination of the sides of some of the channels forming portions of the bottoms of adjacent channels. Also the channels need not radiate from a common axis, although as shown they have a substantially common axis at C. Channels 86 and 88 are angularly spaced at 90° to each other, and so are channels 90 and 92, with an acute angle between channels 88 and 90, and an obtuse angle between channels 92 and 86. The web 94 which is the bottom of channel 86 serves also as a major portion of the bottom of channel 92, the bottoms of the other three channels are formed by portions of the sides of one or more of the adjacent channels, as shown, to form a suitable strong framework for the extrusion for providing a substantially rigid joint between the adjacent wall panels.

The present type of sealing and gripping means in the framing channels for the edges of wall panels for buildings, containers and the like, may also be used in small picture framing as well as in framing large murals whereby the frame sides do not have to be fixed to each other at the corners, as they are in conventional frames. The strips 24 provide a sufficiently good grip on the picture panel, including any front or backing sheets, to hold the frame channel extrusion together in assembled form without the aid of any corner attaching or fastening means. The channel extrusion may be made very light, and will derive its strength primarily from the picture panel, or backing sheet, or glass front, or any combination of these.

Many obvious modifications in the details of construction and arrangement of channels in these extrusions and sealing strips may be made without departing from the spirit and scope of the present invention, as defined in the appended claims.

What is claimed is:
1. A panel having an edge framed in a one piece channel extrusion,
    said channel extrusion comprising
        a bottom wall and at least one pair of parallel sides extending therefrom,
        said sides being spaced to provide a suitable clearance for said panel to be inserted therebetween, and
    means on the inside of at least one of said sides, for gripping the edge of said panel in the channel of said extrusion,
        each of said side gripping means including a flat strip mounted in the side of said channel and having at least one elongated rectangular ridge of resiliently flexible material extending sufficiently therefrom and being of a suitable height and width to cause it to substantially bend and rub on the corresponding side of the panel edge when it was inserted into the channel with relatively little resistance and to cause considerably greater frictional resistance against withdrawal of the panel by wedging action of the bent ridges against the corresponding side thereof.
2. A panel having an edge framed in a channel extrusion as defined in claim 1,
    said flat strip having beveled edges, and said side of the channel having a correspondingly-shaped groove with angularly undercut edges for snuggly receiving and holding said flat strip against lateral displacement in the channel side.

3. A panel having an edge framed in a channel extrusion as defined in claim 1,
said flat strips including at least one such rectangular ridge of resiliently flexible material extending from each side of said channel.

4. A panel having an edge framed in a channel extrusion as defined in claim 3,
said flat strips having beveled edges and being mounted in correspondingly-shaped grooves with undercut edges in each of the corresponding sides of the channel to fix the rectangular ridges against lateral displacement in said channel.

5. A panel having an edge framed in a channel extrusion as defined in claim 4,
each flat strip having a plurality of laterally-spaced ridges to provide better sealing and increased friction against withdrawal of the panel from the frame.

6. A panel having an edge framed in a channel extrusion as defined in claim 2,
said extrusion having an additional pair of parallel sides extending from the opposite side of said bottom wall to form an additional channel joining another panel edge in abutting relation,
each of said channels being provided with said gripping means.

7. A panel having an edge framed in a channel extrusion as defined in claim 6,
said additional pair of parallel sides being coextensive with said first pair.

8. A panel having an edge framed in a channel extrusion as claimed in claim 7,
said extrusion having a second additional pair of parallel sides extending outwardly from one of the coextensive sides of said first and additional pairs for receiving the edge of another panel.

9. A panel having an edge framed in a channel extrusion as defined in claim 2,
one side of said channel being extended beyond its bottom wall to form the bottom wall of another channel, and another pair of parallel sides extending from said extrusion to form said other channel integral with said first channel.

10. A panel having an edge framed in a channel extrusion as defined in claim 7, and a third pair of parallel sides extending outwardly from one of said coextensive sides.

11. A panel having an edge framed in a channel extrusion as defined in claim 10,
said third pair of parallel sides extending at a 90 degree angle from the coextensive side.

12. A panel having an edge framed in a channel extrusion as defined in claim 11, and a fourth pair of parallel sides extending from the opposite coextensive side.

13. A panel having an edge framed in a channel extrusion as defined in claim 12, said fourth pair of parallel sides extending at 90 degrees from said opposite coextensive side.

14. A panel having an edge framed in a channel extrusion as defined in claim 1, and at least one additional pair of parallel sides extending rectangularly from the opposite sides of said channel to form additional channels.

15. A panel having an edge framed in a channel extrusion as defined in claim 14, said channel extrusion having a plurality of additional pairs of parallel sides radiating from the outside of said channel in angularly-spaced relation to form additional channels.

16. A panel having an edge framed in a channel extrusion as defined in claim 15, at least two of said plurality of additional channels having their bottoms formed in part by one of the sides and adjacent half of the bottom of said first channel and by the other side and its adjacent half of the bottom of said first channel respectively.

17. A panel having an edge framed in a channel extrusion as defined in claim 15, said plurality comprising three additional channels, having a substantially common center axis of radiation.

18. A panel having an edge framed in a channel extrusion as defined in claim 17, one of said additional channels radiating at right angles to said first channel, the other two additional channels radiating from said common axis at right angles to each other and being angularly spaced by supplementary angles from the first channel and from said additional channels respectively.

References Cited

UNITED STATES PATENTS

| | | | |
|---|---|---|---|
| 1,498,201 | 6/1924 | Reeves | 49—489 |
| 2,976,969 | 3/1961 | Gillespie | 52—464 |
| 3,023,859 | 3/1962 | Muessell | 52—397 X |
| 3,123,869 | 3/1964 | May | 52—397 |
| 3,147,518 | 9/1964 | Horgan | 52—397 X |
| 3,167,825 | 2/1965 | Zoller | 49—490 |

JOHN E. MURTAGH, *Primary Examiner.*